(12) United States Patent
Sayama

(10) Patent No.: US 10,300,756 B2
(45) Date of Patent: May 28, 2019

(54) SUSPENSION COIL SPRING

(71) Applicant: MITSUBISHI STEEL MFG. CO., LTD., Tokyo (JP)

(72) Inventor: Hironobu Sayama, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 15/307,083

(22) PCT Filed: May 25, 2015

(86) PCT No.: PCT/JP2015/064882
§ 371 (c)(1),
(2) Date: Oct. 27, 2016

(87) PCT Pub. No.: WO2015/182543
PCT Pub. Date: Dec. 3, 2015

(65) Prior Publication Data
US 2017/0050486 A1 Feb. 23, 2017

(30) Foreign Application Priority Data

May 28, 2014 (JP) ................. 2014-109767

(51) Int. Cl.
*B60G 11/14* (2006.01)
*F16F 1/06* (2006.01)
(Continued)

(52) U.S. Cl.
CPC .............. *B60G 11/14* (2013.01); *B60G 11/16* (2013.01); *B60G 15/063* (2013.01); *F16F 1/025* (2013.01);
(Continued)

(58) Field of Classification Search
CPC ........... B60G 11/14; B60G 15/062; F16F 1/06
See application file for complete search history.

(56) References Cited

U.S. PATENT DOCUMENTS

| 4,903,985 A | 2/1990 | Muhr et al. |
| 5,259,599 A * | 11/1993 | Hernandez ............ F16F 1/042 267/166 |

(Continued)

FOREIGN PATENT DOCUMENTS

| DE | 4203658 | 8/1993 |
| DE | 202013002175 | 3/2013 |

(Continued)

OTHER PUBLICATIONS

International Search Report dated Jun. 30, 2015.
Extended European Search Report for 15798841.1 dated Mar. 17, 2017.

*Primary Examiner* — Vishal R Sahni
(74) *Attorney, Agent, or Firm* — IPUSA, PLLC

(57) ABSTRACT

To provide a suspension coil spring capable of reducing a bowing amount and friction generated in a shock absorber, under a compressed state.

A suspension coil spring (10) that is mounted between an upper seat (22) and a lower seat (24) in a strut suspension (12) for an automobile, includes an upper end turn (32) that sits on the upper seat (22); a spring active portion (11) that includes one or more coils each of which is formed such that a portion whose curvature is the largest is positioned at an automobile outer side under a mounted state; and a lower end turn (34) that sits on the lower seat (24) while substantially contacting the lower seat (24) at a single lower contacting point (P3) that is positioned at the automobile outer side with respect to a center point of the lower end turn (34).

4 Claims, 7 Drawing Sheets

(51) Int. Cl.
*F16F 9/32* (2006.01)
*B60G 11/16* (2006.01)
*B60G 15/06* (2006.01)
*F16F 1/02* (2006.01)
*F16F 1/04* (2006.01)
*F16F 1/12* (2006.01)

(52) U.S. Cl.
CPC ............... *F16F 1/047* (2013.01); *F16F 1/06* (2013.01); *F16F 1/123* (2013.01); *F16F 9/32* (2013.01); *B60G 15/062* (2013.01); *B60G 2200/142* (2013.01); *B60G 2202/12* (2013.01); *B60G 2202/312* (2013.01); *B60G 2204/124* (2013.01); *B60G 2204/1242* (2013.01); *B60G 2206/426* (2013.01)

(56) References Cited

U.S. PATENT DOCUMENTS

| | | | |
|---|---|---|---|
| 6,543,757 B2 * | 4/2003 | Imaizumi | 267/179 |
| 2001/0011791 A1 * | 8/2001 | Hasegawa | B21F 3/02 |
| | | | 267/166 |
| 2001/0035601 A1 * | 11/2001 | Imaizumi | F16F 1/047 |
| | | | 267/286 |
| 2002/0125623 A1 * | 9/2002 | Kessen | B60G 15/062 |
| | | | 267/221 |
| 2002/0190452 A1 * | 12/2002 | Drager | F16F 1/04 |
| | | | 267/180 |
| 2004/0169324 A1 | 9/2004 | Bottene et al. | |
| 2005/0051937 A1 * | 3/2005 | Umezawa | F16F 1/12 |
| | | | 267/179 |
| 2007/0013161 A1 * | 1/2007 | Rhein | B60G 11/14 |
| | | | 280/124.162 |
| 2007/0120303 A1 * | 5/2007 | Rhein | B60G 11/14 |
| | | | 267/286 |
| 2010/0065997 A1 * | 3/2010 | Liu | B60G 11/14 |
| | | | 267/286 |
| 2010/0090384 A1 * | 4/2010 | Fenioux | F16F 1/042 |
| | | | 267/166 |
| 2011/0031667 A1 * | 2/2011 | Isobe | F16F 1/042 |
| | | | 267/180 |
| 2013/0099435 A1 * | 4/2013 | Matsuoto | F16F 1/047 |
| | | | 267/166 |

FOREIGN PATENT DOCUMENTS

| | | |
|---|---|---|
| EP | 0728602 | 8/1996 |
| FR | 2742830 | 6/1997 |
| JP | S58-032970 U | 7/1983 |
| JP | 59190528 * | 10/1984 |
| JP | S60-095311 U | 6/1985 |
| JP | 60237235 * | 11/1985 |
| JP | 60241535 * | 11/1985 |
| JP | S60-237235 | 11/1985 |
| JP | 61167728 * | 7/1986 |
| JP | H1-156119 | 6/1989 |
| JP | H2-049703 U | 4/1990 |
| JP | 2000-104772 | 4/2000 |
| WO | 2003/046406 | 6/2003 |

* cited by examiner

SUSPENSION COIL SPRING

BACKGROUND OF THE INVENTION

1. Field of the Invention

The present invention relates to a suspension coil spring used in a strut suspension for an automobile.

2. Description of the Related Art

Recently, strut suspensions are widely provided as suspensions for automobiles. The strut suspensions are configured such that a shock absorber, including a cylinder and a rod that is slidably supported by the cylinder, is used as a strut for determining a position with respect to a wheel, and a suspension coil spring is provided at outer peripheries of the rod and the cylinder.

In the above described structure, an upper end of the rod is connected to an automobile body via a strut mount or the like, and a lower end of the cylinder is rigidly connected to a knuckle that rotatably supports the wheel. The knuckle is pivotally connected to the automobile body via a lower control arm. The suspension coil spring is provided between an upper seat at which an upper end of the rod is fixed, and a lower seat at which a lower end of the cylinder is fixed in a compressed state.

Such a strut suspension has merits such as the number of components is small, the structure is simple and a space necessary to be installed is small, compared with other independent suspensions.

However, a bending moment is generated in a strut suspension due to a shift between a strut axis and a load input axis (an axis connecting a tire contacting point and an upper mount point of a strut). The bending moment causes the generation of a lateral force that is different from a sliding direction of a shock absorber, which increases friction of a rod to prevent a smooth operation of the shock absorber and which becomes a factor to worsen ride quality of an automobile.

Various suspension coil springs are offered in order to reduce such a bending moment. For example, Patent Document 1 offers a structure in which a suspension coil spring is decentered with respect to a strut, and including a pigtail end turn that is connected after being decentered. Patent Document 2 offers a suspension coil spring configured such that a center line of the spring has an S shape under an unloaded state.

Further, Patent Document 3 offers a suspension coil spring in which a plurality of protrusions are provided at its end turn portion, and configured such that the protrusions selectively contact a spring seat in accordance with the magnitude of an applied load. Further, Patent Document 4 offers a suspension coil spring in which strong striking portions are provided at an upper end turn and a lower end turn, respectively.

PATENT DOCUMENTS

[Patent Document 1] Japanese Utility Model No. S58-032970
[Patent Document 2] Japanese Patent No. 2642163
[Patent Document 3] Japanese Patent No. 4336203
[Patent Document 4] European Laid-open Patent Publication No. 728602

However, as the suspension coil spring disclosed in Patent Document 1 is decentered with respect to the strut, it may be difficult to make it in a small size. Further, a sufficient effect of reducing the bending moment may not be obtained with the structure in which the pigtail end turn is connected at a lower portion of the suspension coil spring after being decentered. For the suspension coil spring disclosed in Patent Document 2, there is a problem that it is difficult to make it in a small size because a certain space is necessary for the spring to make its center line in the S shape.

Further, for the suspension coil spring disclosed in Patent Document 3, there is a problem that manufacturing steps are complicated because it is necessary to provide the plurality of protrusions at the end turn portion. For the suspension coil spring disclosed in Patent Document 4, as the strong striking portion is a single point on a wire of the end turn, in particular, the point of action (upper load position) of the spring reaction force with respect to the upper seat cannot be positioned at a center of the end turn, and reduction of the bending moment may be difficult.

Furthermore, there is a problem for a strut suspension that a bowing amount becomes large under a compressed state, in particular, when the height is large with respect to an external diameter (width) of the suspension coil spring due to inconsistency of the load input axis and the center axis of the suspension coil spring.

SUMMARY OF THE INVENTION

The present invention is made in light of the above problems, and provides a suspension coil spring capable of reducing a bowing amount and friction generated in a shock absorber, under a compressed state.

According to a first aspect, there is provided a suspension coil spring that is mounted between an upper seat and a lower seat in a strut suspension for an automobile, including an upper end turn that sits on the upper seat; a spring active portion that includes one or more coils each of which is formed such that a portion whose curvature is the largest is positioned at an automobile outer side under a mounted state; and a lower end turn that sits on the lower seat while substantially contacting the lower seat at a single lower contacting point that is positioned at the automobile outer side with respect to a center point of the lower end turn.

According to the embodiment, a suspension coil spring capable of reducing a bowing amount and friction generated in a shock absorber, under a compressed state, is provided.

DETAILED DESCRIPTION OF THE PREFERRED EMBODIMENTS

Figure 1:
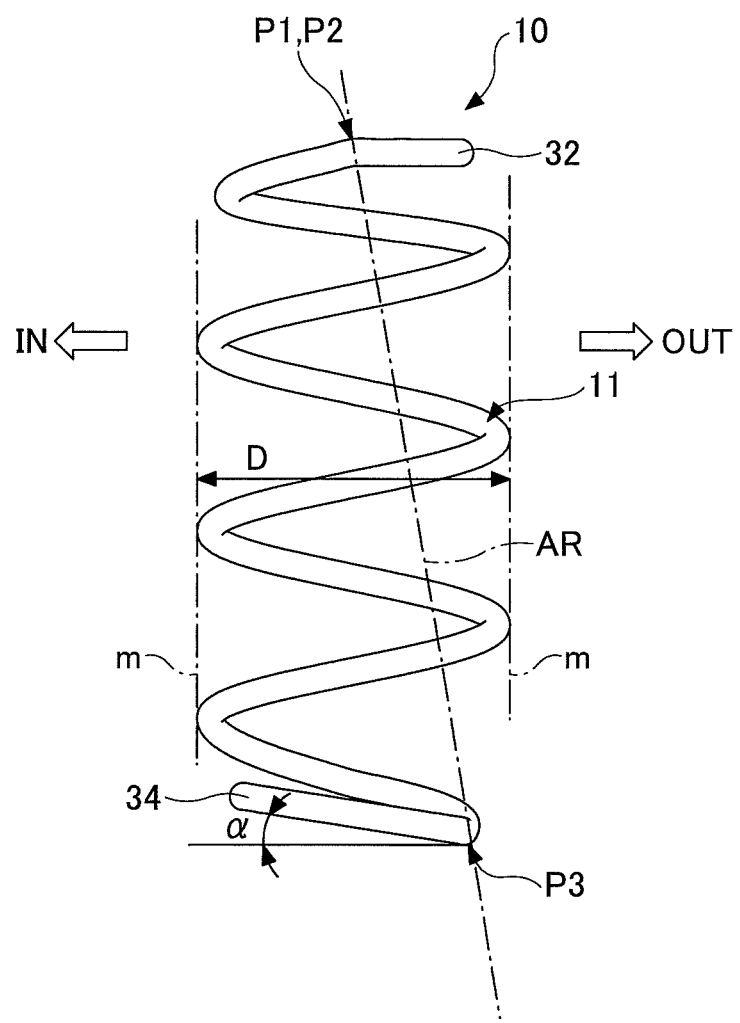
FIG. 1 is a front elevation view of a suspension coil spring of an embodiment.

The invention will be described herein with reference to illustrative embodiments. It is to be noted that, in the explanation of the drawings, the same components are given the same reference numerals, and explanations are not repeated.

Figure 2:
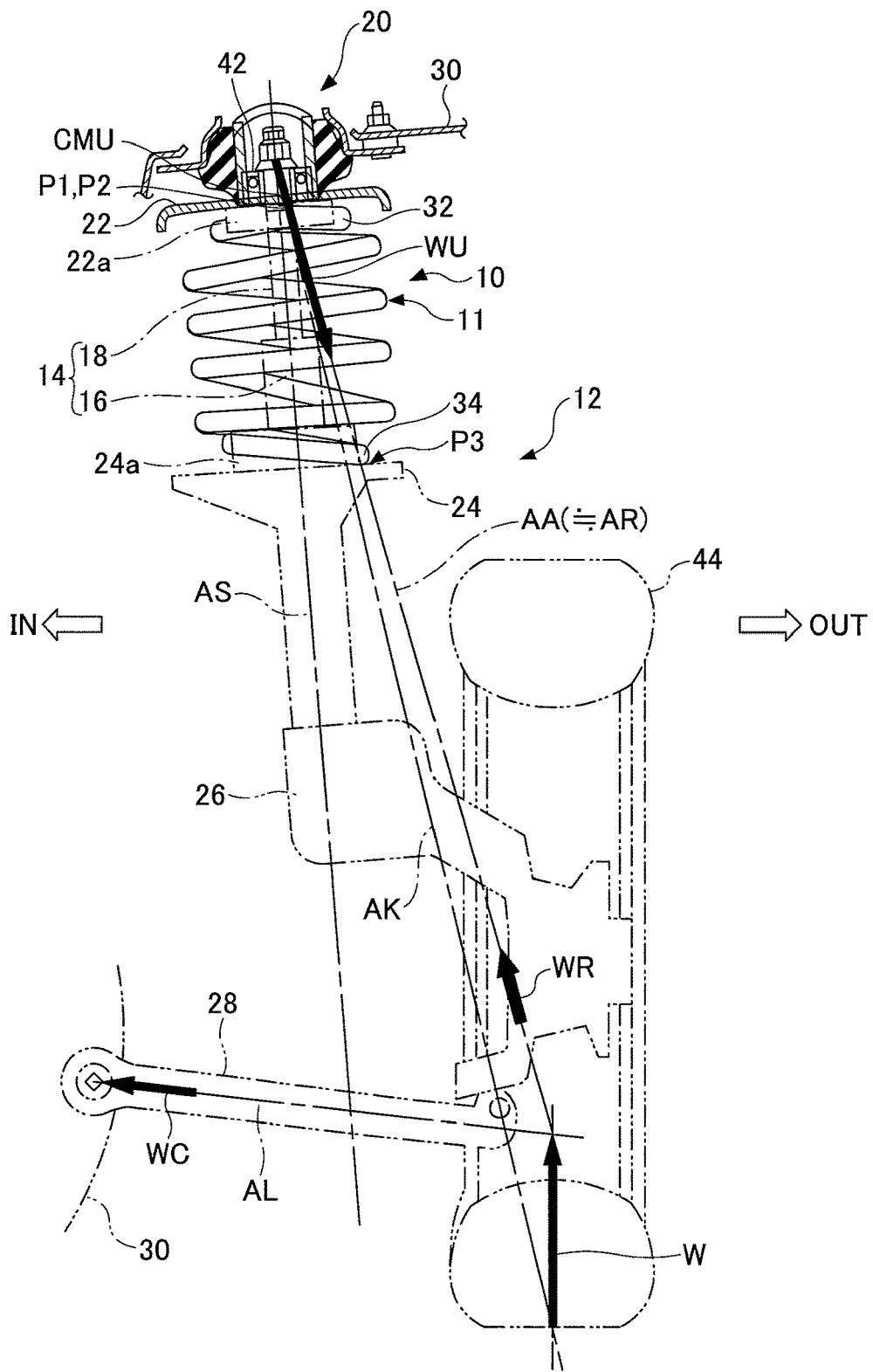
FIG. 2 is a side view illustrating a structure of a strut suspension in which the suspension coil spring of the embodiment is incorporated.
Figure 3:
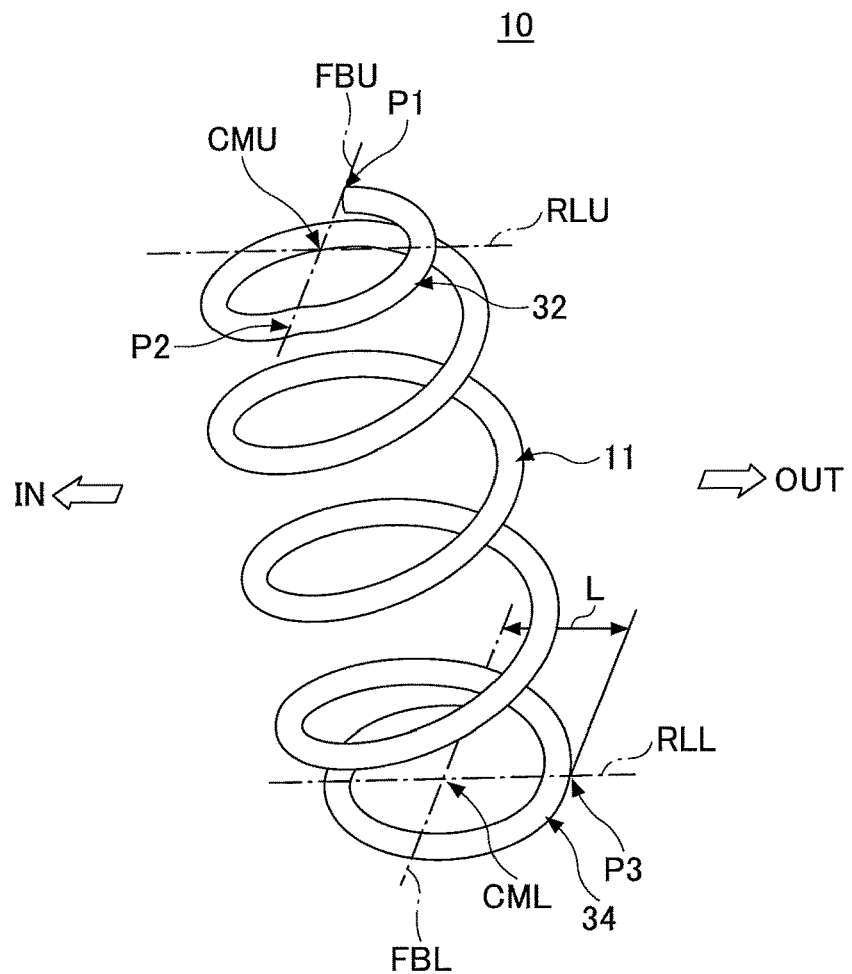
FIG. 3 is a perspective view illustrating the suspension coil spring of the embodiment.

FIG. 1 and FIG. 3 are views illustrating an example of a suspension coil spring 10 of the embodiment. FIG. 2 is a view illustrating an example of a strut suspension 12 (hereinafter, simply referred to as a "suspension 12") in which the suspension coil spring 10 is incorporated. In FIG. 2, components except a support portion of the suspension coil spring 10 at an upper end is illustrated by a two-dot chain line. Further, in the following drawings, an "IN" direction of a knockout arrow indicates an automobile inner side, and an "OUT" direction indicates an automobile outer side.

First, a structure of the suspension 12 is described.

As illustrated in FIG. 2, the suspension 12 includes a shock absorber 14 as a strut for positioning an automobile wheel 44. The shock absorber 14 includes a cylinder 16 in which fluid such as gas, oil or the like is filled, and a rod 18 that is connected to a piston (not illustrated in the drawings) slidably placed in the cylinder 16 to protrude upward from the cylinder 16.

An upper end portion of the rod 18 is resiliently connected to an automobile body 30 via the strut mount 20. An upper seat 22 is provided at an upper end of the rod 18, and a lower seat 24 is provided at a middle portion of the cylinder 16.

The suspension coil spring 10 is placed at an outer periphery of the shock absorber 14 between the upper seat 22 and the lower seat 24 in a compressed state. As a result, spring reaction force WR is generated at the suspension coil spring 10 in a mounted state. In the following description, an axis line to which the spring reaction force WR is applied is referred to as a "spring reaction force axis AR".

The lower end portion of the shock absorber 14 is rigidly connected to a knuckle 26 that rotatably supports the automobile wheel 44. The knuckle 26 is pivotally connected to the automobile body 30 via a lower control arm 28.

With this configuration, the automobile wheel 44 pivotally supported by the knuckle 26 supports the automobile body 30 via the shock absorber 14 and the suspension coil spring 10, and supports the automobile body 30 via the lower control arm 28.

Next, a structure of the suspension coil spring 10 is described.

FIG. 1 is a front elevation view of the suspension coil spring 10 under a free state. In the suspension coil spring 10, an upper end turn portion 32 that sits on the upper seat 22 is formed at an upper side of a spring active portion 11, and a lower end turn portion 34 that sits on the lower seat 24 is formed at a lower side of the spring active portion 11.

Although the suspension coil spring 10 of the embodiment is configured such that an outline "m" of the spring active portion 11 is straight, under the free state in which load is not applied, this is not limited so. Further, although the external diameter D in a front elevation view of coils of the spring active portion 11 except the upper end turn portion 32, the lower end turn portion 34 and transition portions to the end turn portions, respectively, is formed to have a certain size, under the free state, this is not limited so.

The suspension coil spring 10 is mounted on the suspension 12 under a compressed state while its upper end turn portion 32 sits on the upper seat 22 and its lower end turn portion 34 sits on the lower seat 24. As illustrated in FIG. 2, each of the upper seat 22 and the lower seat 24 of the suspension 12 is formed to have a substantially circular disc shape, and ribbed insertion portions 22a and 24a are formed at center positions thereof, respectively. The upper end turn portion 32 of the suspension coil spring 10 is mounted on the upper seat 22 such that the insertion portion 22a is inserted therein. The lower end turn portion 34 is mounted on the lower seat 24 such that the insertion portion 24a is inserted therein. With this configuration, the suspension coil spring 10 is positioned between the upper seat 22 and the lower seat 24.

Here, structures of the upper end turn portion 32 and the lower end turn portion 34 of the suspension coil spring 10, a contacting position of the upper end turn portion 32 and the upper seat 22 and a contacting position of the lower end turn portion 34 and the lower seat 24 are described.

In the following description, a center position of the upper end turn portion 32 is referred to as an "center position of the upper end turn CMU", and a center position of the lower end turn portion 34 is referred to as a "center position of the lower end turn CML" (see FIG. 3).

Further, a line segment that passes on the center position of the upper end turn CMU and extends in a front-back direction of the automobile body is referred to as a "front-back direction upper line FBU", and a line segment that passes on the center position of the upper end turn CMU and extends in a right-left direction of the automobile body is referred to as a "right-left direction upper line RLU". Similarly, a line segment that passes on the center position of the lower end turn CML and extends in the front-back direction of the automobile body is referred to as a "front-back direction lower line FBL", and a line segment that passes on the center position of the lower end turn CML and extends in the right-left direction of the automobile body is referred to as a "right-left direction lower line RLL".

The suspension coil spring 10 of the embodiment is formed such that the lower seat 24 and the lower end turn portion 34 substantially contact at a single lower contacting point P3, that is positioned at the automobile outer side with respect to the center position CML of the lower end turn portion 34 on the lower end turn portion 34.

Here, "the lower seat 24 and the lower end turn portion 34 substantially contact at the single lower contacting point P3" means that even when a position of the lower end turn portion 34 other than the lower contacting point P3 (hereinafter, referred to as a "position other than P3") contacts the lower seat 24, load applied to the position other than P3 is small compared with load applied to the lower contacting point P3.

As illustrated in FIG. 1, the lower end turn portion 34 is formed in a reverse pitch (a spring wire is wound such that the pitch decreases) such that to form an angle "α" with respect to a direction that is perpendicular to the outline "m" of the spring active portion 11. Further, as illustrated in FIG. 3, the lower contacting portion P3 is provided at a position on the right-left direction lower line RLL and is apart from the center position of the lower end turn CML by a distance L at the automobile outer side.

Further, the suspension coil spring 10 of the embodiment is formed such that the number of turns of the upper end turn portion 32 is 0.5 turns (180° turns), the upper end turn portion 32 bends at a portion that is connected to the spring active portion 11 and contacts the upper seat 22 mainly at upper contacting portions P1 and P2 illustrated in FIG. 1 and FIG. 3.

As illustrated in FIG. 3, the upper end turn portion 32 is configured to have a substantially semi-circular arc shape and to be positioned at the automobile outer side with respect to the front-back direction upper line FBU. Further, the upper contacting portions P1 and P2 of the upper end turn portion 32 are provided to be apart from each other for 180° on the front-back direction upper line FBU such that a line segment connecting the upper contacting portions P1 and P2 and the front-back direction upper line FBU overlap.

Here, the upper contacting portion P1 of the upper end turn portion 32 is an end portion of a spring wire that constitutes the suspension coil spring 10. Further, the upper contacting portion P2 is a portion to be connected to the spring active portion 11 at a position 0.5 turns from the upper contacting portion P1 (a position wound for 180° turns from the upper contacting portion P1). The upper end turn portion 32 is configured to be substantially symmetrical with respect to the right-left direction upper line RLU.

With the above configuration, the upper end turn portion 32 of the suspension coil spring 10 is mounted on the suspension 12 while only the upper contacting portions P1 and P2 substantially strongly contact the upper seat 22 compared with other portions of the upper end turn portion 32. The upper contacting portions P1 and P2 position on the front-back direction upper line FBU under a mounted state of the suspension coil spring 10 on the suspension 12, and a substantially center position of the upper contacting portion P1 and the upper contacting portion P2 becomes the center position of the upper end turn CMU.

Here, "the upper seat 22 and the upper end turn portion 32 substantially contact at only two points, the upper contacting points P1 and P2" means that even when a position of the upper end turn portion 32 other than the upper contacting points P1 and P2 (hereinafter, referred to a "position other than P1 and P2") contacts the upper seat 22, load applied to the position other than P1 and P2 is small compared with load applied to each of the upper contacting points P1 and P2.

Next, with reference to FIG. 2, the load applied to the suspension 12 on which the suspension coil spring 10 is mounted is described.

In FIG. 2, "AS" is a strut axis that is a center axis of the shock absorber 14, "AK" is a king pin axis that is a steering center axis of the automobile wheel 44, "AL" is a lower control arm axis that is a center axis of the lower control arm 28, and "AA" is a load input axis from a road surface to the shock absorber 14.

Road surface reaction force W from the road surface is applied to the suspension 12 from a center position of a contacting surface of the automobile wheel 44 in a vertical direction. Further, load axis line force WU that opposes the road surface reaction force W is applied to the suspension 12 along the load input axis AA from an upper end of the shock absorber 14. Lower control arm axial force WC that is resultant force of the road surface reaction force W and the load axis line force WU is applied to a root portion of the lower control arm 28 along the lower control arm axis AL.

It is considered that, in addition to the lower contacting point P3, the position other than P3 contacts the lower seat 24, when the road surface reaction force W from the road surface via the automobile wheel 44 is input in the suspension 12 and the suspension coil spring 10 deforms with respect to the lower seat 24.

However, at this contacting time, load applied to the position other than P3 is small compared with load applied to the lower contacting point P3. Thus, even when the position other than P3 contacts the lower seat 24, the spring reaction force WR is mainly applied on the lower contacting point P3 or a position near the lower contacting point P3.

Here, the load input axis AA along which the load axis line force WU is applied and the spring reaction force axis AR along which the spring reaction force WR of the suspension coil spring 10 is applied are described.

In this embodiment, the lower contacting point P3 or its vicinity point at which the lower seat 24 and the lower end turn portion 34 substantially contact becomes a lower point of action of the spring reaction force WR. This lower point of action of the spring reaction force WR is movable by adjusting the angle "α" or the like of the lower end turn portion 34, and is provided at a position that can substantially conform the spring reaction force axis AR and the load input axis AA with each other (AR≈AA). With this configuration, it is possible to avoid generation of lateral force and suppress the generation of friction in the shock absorber 14 by canceling the load axis line force WU by the spring reaction force WR.

Meanwhile, for the suspension coil spring 10 of the embodiment, as the substantially center position of the upper contacting portions P1 and P2 is the center position of the upper end turn CMU, and the upper end turn portion 32 contacts the upper seat 22 at substantially the two points, the upper end turn portion 32 has a structure capable of being oscillated with respect to the upper seat 22 over the front-back direction upper line FBU connecting the upper contacting points P1 and P2 as a center.

Thus, when the suspension coil spring 10 of the embodiment is used in the suspension 12, an upper point of action of the spring reaction force WR is positioned substantially at the center position of the upper end turn CMU and does not move from this position.

Figure 5A:
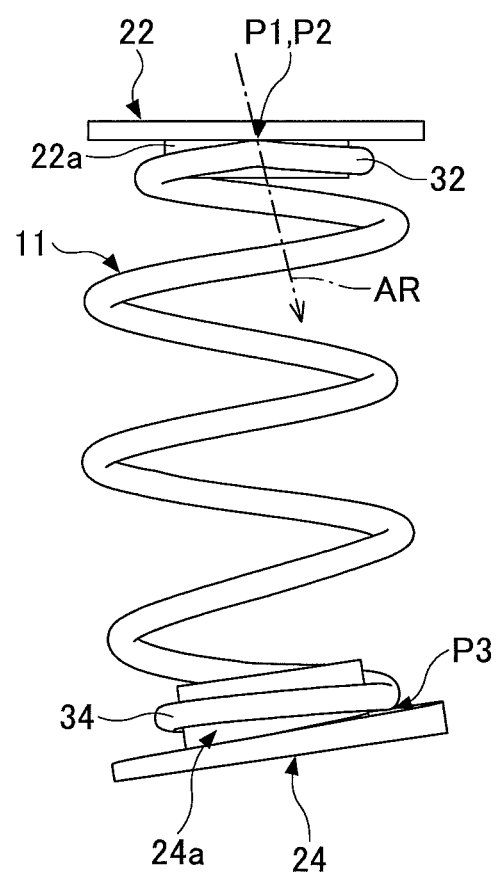
FIG. 5A is a view for describing an operation of the suspension coil spring of the embodiment.
Figure 5B:
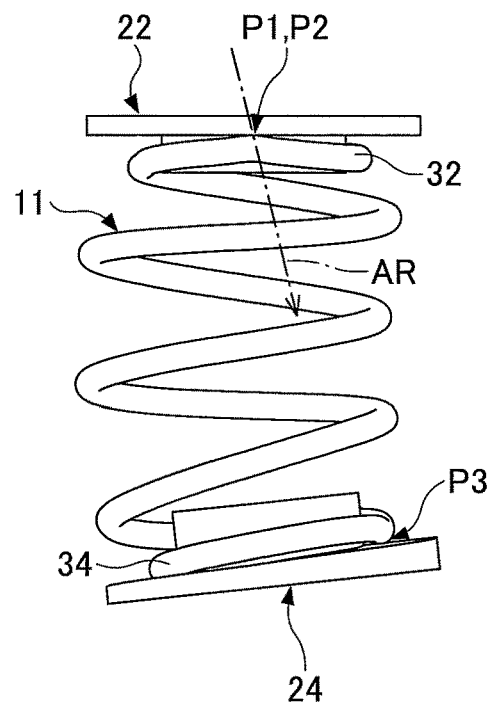
FIG. 5B is a view for describing an operation of the suspension coil spring of the embodiment.
Figure 5C:
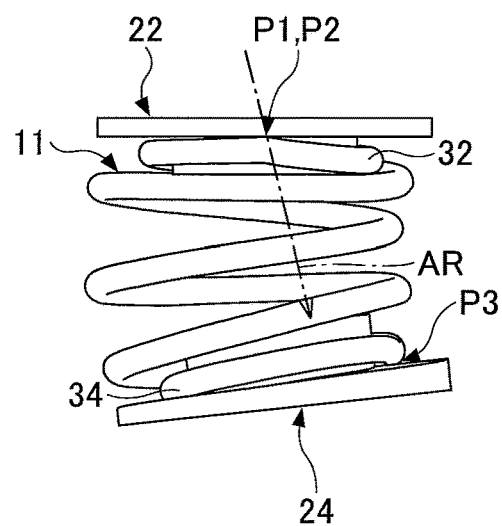
FIG. 5C is a view for describing an operation of the suspension coil spring of the embodiment.

When the suspension coil spring 10 is mounted on the suspension 12, and the road surface reaction force W from the road surface via the automobile wheel 44 is input to the suspension 12, the suspension coil spring 10 deforms with respect to the upper seat 22 (see FIG. 5A to FIG. 5C). At this time, as the upper end turn portion 32 oscillates over the front-back direction upper line FBU that connects the upper contacting points P1 and P2 as a center, it is considered that a position other than P1 and P2 contacts the upper seat 22 in addition to the upper contacting points P1 and P2.

However, at this contacting time, load applied to the position other than P1 and P2 is small compared with load applied to each of the upper contacting points P1 and P2. Thus, even when the position other than P1 and P2 contacts the upper seat 22, the spring reaction force WR is mainly applied to the center position of the upper contacting points P1 and P2, in other words, the center position of the upper end turn CMU. Thus, substantially uniform load is applied to the bearing portion 42 of the strut mount 20, and wrenching of the mount can be suppressed.

Next, a shape of the spring active portion 11 of the suspension coil spring 10 of the embodiment is described.

Figure 4:
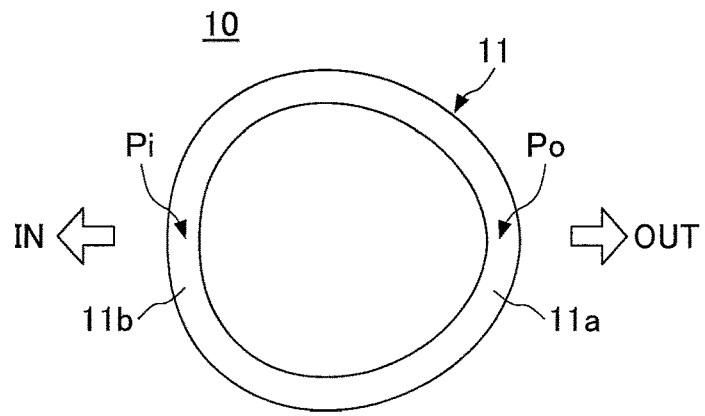
FIG. 4 is a view for describing a shape of a spring active portion of the suspension coil spring of the embodiment.

FIG. 4 is a view for describing the shape of the spring active portion 11 of the suspension coil spring 10 of the embodiment.

As illustrated in FIG. 4, the spring active portion 11 includes a first spring portion 11a at the automobile outer side and a second spring portion 11b at the automobile inner side. The spring active portion 11 has a structure in which the first spring portion 11a and the second spring portion 11b are alternately formed substantially every half turn (0.5 turn).

Here, the curvature at Po, which is located most near automobile outer side, of the first spring portion 11a is formed to be larger than the curvatures at other positions of the first spring portion 11a, all of the positions of the second spring portion 11b and all of portions connecting the first spring portion 11a and the second spring portion 11b. In particular, a feature is that the curvature of the first spring portion 11a at Po is larger than the curvature of the second spring portion 11b at Pi, which is located most near automobile inner side. The spring active portion 11 is formed to have a substantially egg shape in a plan view in which the first spring portion 11a and the second spring portion 11b, the curvature gradually varies in each of them, are smoothly connected.

The shape of the spring active portion 11 is obtained based on a curvature variation formula expressed by the following formula (1), for example.

$$(X/W)^a + (Y/H)^a = 1 \qquad (1)$$

"H" is radius of a coil in the front-back direction of the automobile body, and "W" is radius of a coil in the right-left direction of the automobile body. The shape of the spring active portion 11 is formed by a combination of shapes by varying "W", "H" and "a" as variables, as a base.

Here, for example, if the spring active portion 11 is formed to have a complete round shape in a plan view, and in addition to be the strut suspension, as the lower contacting portion P3 is shifted toward the automobile outer side, the bowing amount that the automobile inner side protrudes becomes larger under the compressed state. If the bowing amount of the suspension coil spring 10 is large, the direction of application of the spring reaction force WR shifts from the load input axis AA, friction is generated in the shock absorber 14, and the smooth operation of the shock absorber 14 is prevented to worsen the ride quality of the automobile. Further, if the bowing amount is large, a portion at which the stress is increased is locally generated in the spring active portion 11 and the durability of the suspension coil spring 10 is lowered.

However, according to the suspension coil spring 10 of the embodiment, due to the above described shape, the bowing amount of the spring active portion 11 toward the automobile inner side under the compressed state is reduced. Thus, the friction generated in the shock absorber 14 is reduced and the ride quality of the automobile is comfortably retained. Further, the portion at which the stress is increased is not locally generated in the spring active portion 11 under the compressed state, and it is possible to use the suspension coil spring 10 for a long period.

Next, a state of the suspension coil spring 10 is described when the road surface reaction force W is input to the suspension 12 from the automobile wheel 44.

FIG. 5A to FIG. 5C are views illustrating an example of states of the suspension coil spring 10 when the road surface reaction forces W of different magnitude are input from the automobile wheel 44. FIG. 5A illustrates a case when a road surface reaction force $W_A$ is input, FIG. 5B illustrates a case when a road surface reaction force $W_B$ ($>W_A$) is input, and FIG. 5C illustrates a case when a road surface reaction force $W_C$ ($>W_B$) is input.

As illustrated in FIG. 5A to FIG. 5C, the suspension coil spring 10 deforms in accordance with variation of the road surface reaction force W, but the bowing amount under the compressed state is reduced.

When the road surface reaction force W varies, the suspension coil spring 10 deforms in accordance with the magnitude of the road surface reaction force W. In accordance with the deformation of the suspension coil spring 10, contacting states of the lower end turn portion 34 with respect to the lower seat 24 and the upper end turn portion 32 with respect to the upper seat 22 vary.

However, the suspension coil spring 10 of the embodiment is configured, under a state that the suspension coil spring 10 is mounted on the suspension 12, such that the lower seat 24 and the lower end turn portion 34 substantially contact at the single lower contacting point P3 provided at the lower end turn portion 34. With this configuration, the lower end turn portion 34 strongly contacts the lower seat 24 at the lower contacting point P3 as well, and even when the suspension coil spring 10 deforms in accordance with the magnitude of the road surface reaction force W, retains the position on the right-left direction lower line RLL and apart from the center position of the lower end turn CML at the automobile outer side.

Further, for the upper end turn portion 32 as well, under the state that the suspension coil spring 10 is mounted on the suspension 12, the upper seat 22 and the upper end turn portion 32 substantially contact at the two points, the upper contacting points P1 and P2, provided at the upper end turn portion 32.

Thus, as the upper end turn portion 32 and the upper seat 22 strongly contact at the two points, the upper contacting points P1 and P2, the upper seat 22 oscillates over the front-back direction upper line FBU connecting the upper contacting point P1 and the upper contacting point P2 as a center. Thus, even when the suspension coil spring 10 deforms in accordance with the magnitude of the road surface reaction force W, the front-back direction upper line FBU is always maintained at a position that passes on the center position of the upper end turn CMU.

Thus, even when the road surface reaction force W varies, the direction in which the spring reaction force axis AR extends (the direction indicated by an arrow of a dashed line in FIG. 5A to FIG. 5C) does not largely vary. Thus, a state in which the load input axis AA and the spring reaction force axis AR conform with each other is retained, generation of the friction in the shock absorber 14 is prevented, and wrenching of the strut mount 20 is suppressed.

Next, alternative examples of the above described suspension coil spring 10 are described.

Figure 6:
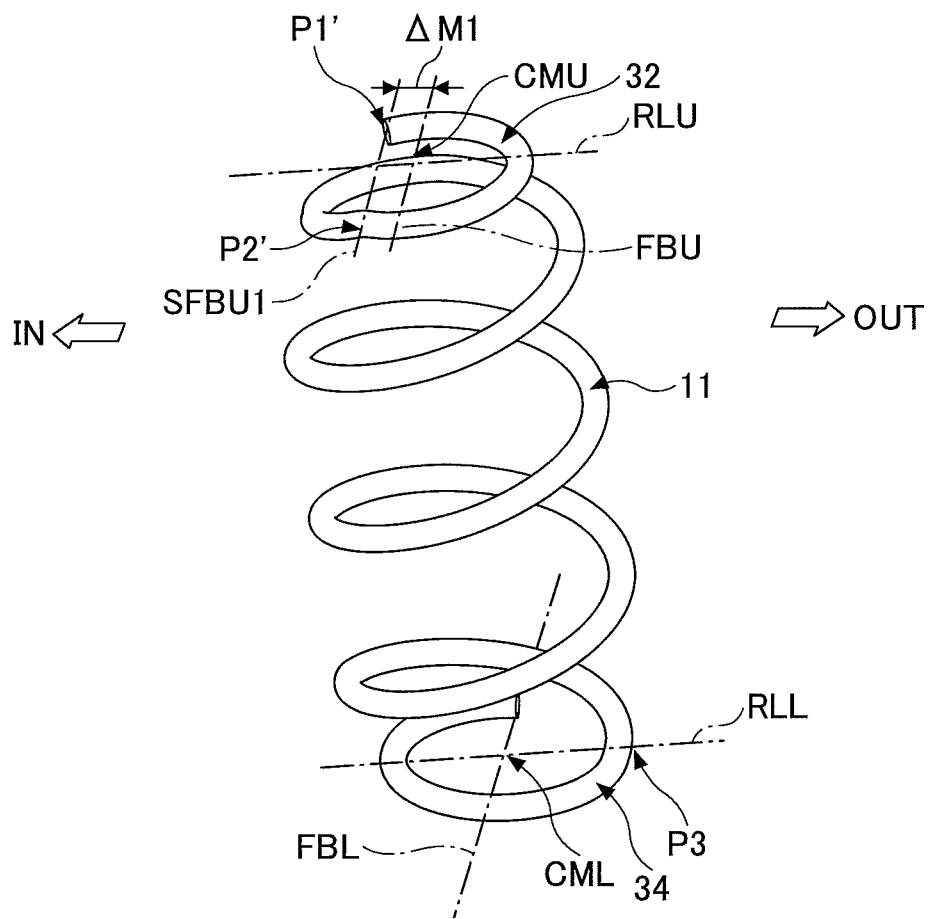
FIG. 6 is a perspective view illustrating a first alternative example of the suspension coil spring of the embodiment.
Figure 7:
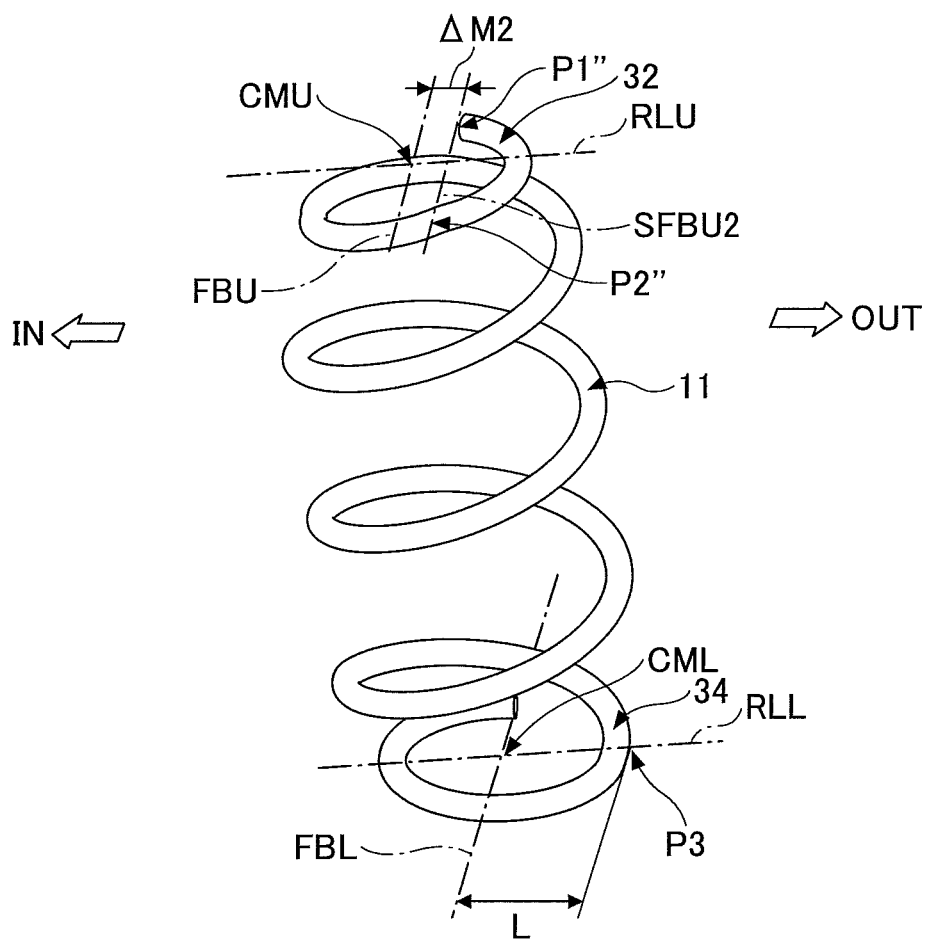
FIG. 7 is a perspective view illustrating a second alternative example of the suspension coil spring of the embodiment.

FIG. 6 and FIG. 7 are views illustrating suspension coil springs 60 and 70, which are alternative examples of the suspension coil spring 10, respectively. In FIG. 6 and FIG. 7, components corresponding to those of the suspension coil spring 10 illustrated in FIG. 1 to FIG. 5C are given the same reference numerals, and explanations are not repeated.

For the suspension coil spring 60 of the alternative example illustrated in FIG. 6, the upper end turn portion 32 is formed to have about 0.6 turns. The suspension coil spring 60 is configured such that a front-back direction upper line SFBU1, which is a line segment connecting the upper contacting points P1' and P2', is in parallel with respect to the front-back direction upper line FBU. Further, the upper end turn portion 32 having about 0.6 turns is formed to be substantially symmetrical with respect to the right-left direction upper line RLU. Further, the front-back direction upper line SFBU1 is formed to be apart from the center position of the upper end turn CMU by a size indicated by an arrow ΔM1 in the drawing at the automobile inner side with respect to the center position of the upper end turn CMU.

For the suspension coil spring 70 of the alternative example illustrated in FIG. 7, the upper end turn portion 32 is formed to have about 0.4 turns. The suspension coil spring 70 is configured such that a front-back direction upper line SFBU2, which is a line segment connecting an upper contacting points P1" and P2", is in parallel with respect to the front-back direction upper line FBU. Further, the upper end turn portion 32 having about 0.4 turns is formed to be substantially symmetrical with respect to the right-left direction upper line RLU. Further, the front-back direction upper line SFBU2 is formed to be apart from the center position of the upper end turn CMU by a size indicated by an arrow ΔM2 in the drawing at the automobile outer side with respect to the center position of the upper end turn CMU.

When the number of turns of the upper end turn portion 32 is less than 0.4 turns, and when the number of turns of the upper end turn portion 32 exceeds 0.6 turns, the distances of the upper contacting points P1 and P2 from the center position of the upper end turn CMU become large, friction at the sliding portion of the shock absorber 14 increases, and the possibility that wrenching of the mount occurs becomes high because unneutral (asymmetric) load (spring reaction force) is applied to the bearing portion of the strut mount 20.

On the other hand, when the number of turns of the upper end turn portion 32 is greater than or equal to 0.4 and less than or equal to 0.6, the friction at the sliding portion of the shock absorber 14 is reduced and the possibility that the wrenching of the mount occurs is lowered.

As described above, according to the suspension coil spring 10 of the embodiment, the bowing amount under the compressed state can be reduced even when the suspension coil spring 10 is made small or light by setting the external diameter of the coil small, or reducing the number of turns, for example. Further, according to the suspension 12 including the suspension coil spring 10, generation of the friction at the shock absorber 14 is reduced, the wrenching of the strut mount 20 is suppressed, and the ride quality of the automobile can be comfortably retained.

The present invention is not limited to the specifically disclosed embodiments, and numerous variations and modifications may be made without departing from the spirit and scope of the present invention.

For example, according to the above described embodiment, it is configured that the spring reaction force axis AR is inclined as the lower end turn portion 34 strongly contacts the lower seat 24 at the substantially single point by forming the lower end turn portion 34 in a reverse pitch. However, a structure may be adopted in which the spring reaction force axis AR is inclined by forming the lower end turn portion to be flat while forming an inclined portion at the lower seat.

Further, according to the above described embodiment, it is configured that the upper end turn portion 32 and the upper seat 22 strongly contact at the two points (upper contacting portions P1 and P2) by setting the number of turns of the upper end turn portion 32 to be about 0.5 turns. However, a structure may be adopted in which protrusions are provided at positions corresponding to the upper contacting portions P1 and P2 of the upper end turn portion 32 or the upper seat 22. With this configuration, it is possible for the upper end turn portion 32 and the upper seat 22 to surely and strongly contact at two points.

The present application is based on and claims the benefit of priority of Japanese Priority Application No. 2014-109767 filed on May 28, 2014, the entire contents of which are hereby incorporated by reference.

NUMERALS 10, 60, 70 suspension coil spring
11 spring active portion
11a first spring portion
11b second spring portion
12 suspension
14 shock absorber
20 strut mount
22 upper seat
24 lower seat
30 automobile body
32 upper end turn portion
34 lower end turn portion
42 bearing portion
44 automobile wheel
AA load input axis
AL lower control arm axis
AR spring reaction force axis
AS strut axis
CA coil axis
CMU center position of upper end turn
CML center position of lower end turn
FBU front-back direction upper line
FBL front-back direction lower line
FBM front-back direction line
m outline
RLU right-left direction upper line
RLL right-left direction lower line
RLM right-left direction line
SFBU1, SFBU2 front-back direction upper line
W road surface reaction force
WU load axis line force
WC lower control arm axial force
WR spring reaction force
P1, P2 upper contacting portion
P3 lower contacting portion

What is claimed is:

1. A suspension coil spring that is mounted between an upper seat and a lower seat in a strut suspension for an automobile, comprising:

an upper end turn that sits on the upper seat;
a spring active portion that includes a plurality of coils each of which extends from an outermost point at an automobile outer side via an innermost point at an automobile inner side to another outermost point at the automobile outer side,
the innermost points of all of the coils being on an inner line, and the outermost points of all of the coils being on an outer line that is in parallel to the inner line; and
a lower end turn that sits on the lower seat while substantially contacting the lower seat at a single lower contacting point that is positioned at the automobile outer side with respect to a center point of the lower end turn, wherein
each of the coils has a substantially oval shape whose curvature gradually changes along a circumference of the oval shape, and a curvature at the outermost point along the circumference of the oval shape is largest among curvatures at other points along the circumference of the oval shape;
the upper end turn is substantially symmetrical with respect to a line segment passing through a center position of the upper end turn and extending in a right-left direction of the automobile;
the upper end turn sits on the upper seat while substantially contacting the upper seat at two upper contacting points that are provided to be apart from each other in a front-back direction of the automobile;
one of the two upper contacting points is an end portion of the suspension coil spring and the other of the two upper contacting points is a portion to be connected to the spring active portion at a position 0.5 turns from the end portion; and
the upper end turn is configured such that, when the upper end turn substantially contacts the upper seat at the two upper contacting points, a load applied to each of the two upper contacting points by the upper seat is larger than a load applied to a portion of the upper end turn between the two upper contacting points.

2. The suspension coil spring according to claim 1, wherein the lower end turn is formed in a reverse pitch.

3. The suspension coil spring according to claim 1,
wherein the upper end turn sits on the upper seat while substantially contacting the upper seat at the two upper contacting points with an interval of the upper end turn disposed between the two upper contacting points and
wherein the interval of the upper end turn does not contact the upper seat.

4. The suspension coil spring according to claim 1, wherein the upper seat is provided at an automobile body side and the lower seat is provided at an automobile wheel side.

* * * * *